Sept. 2, 1958     S. F. STOLL     2,850,058
WORKPIECE LENGTH GAGE FOR POWER SAW TABLES
Filed May 23, 1956     2 Sheets-Sheet 2
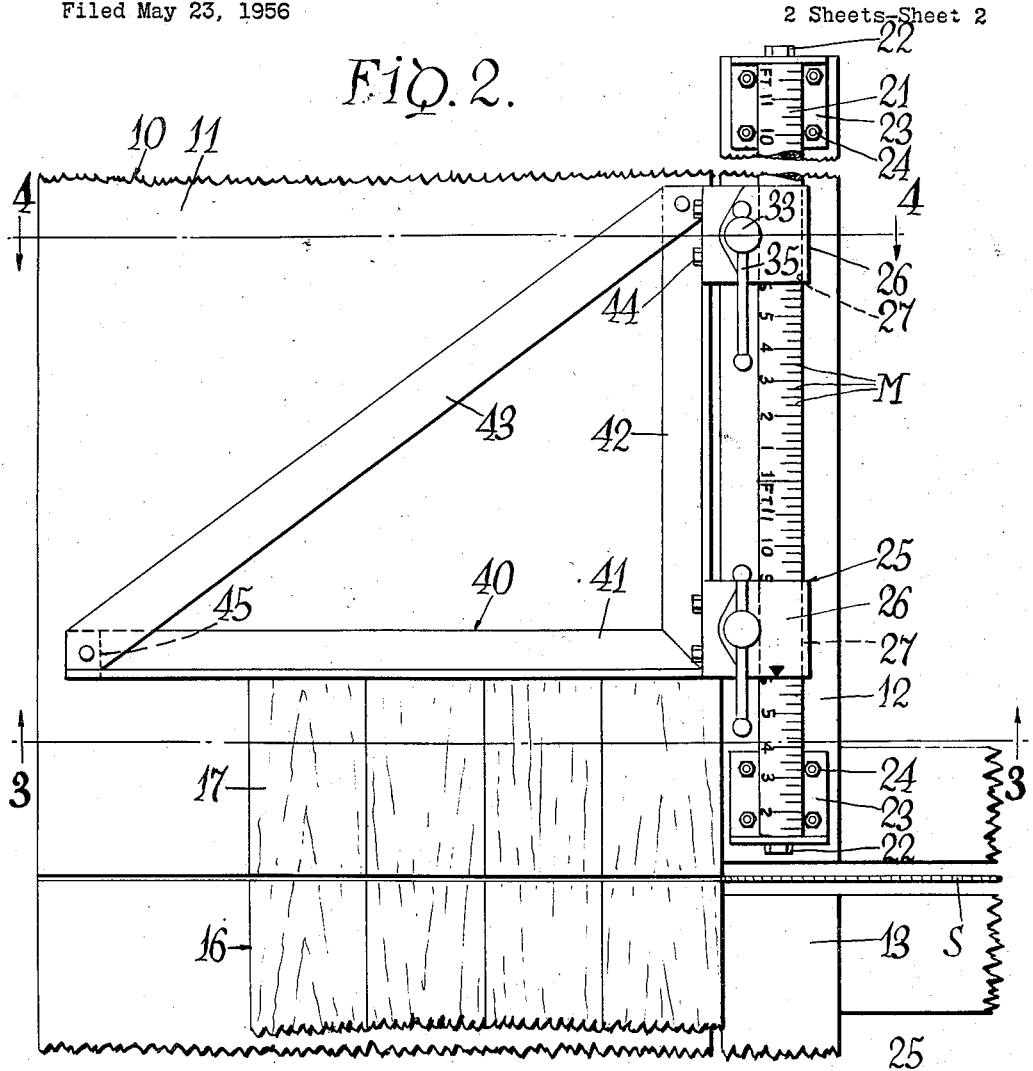
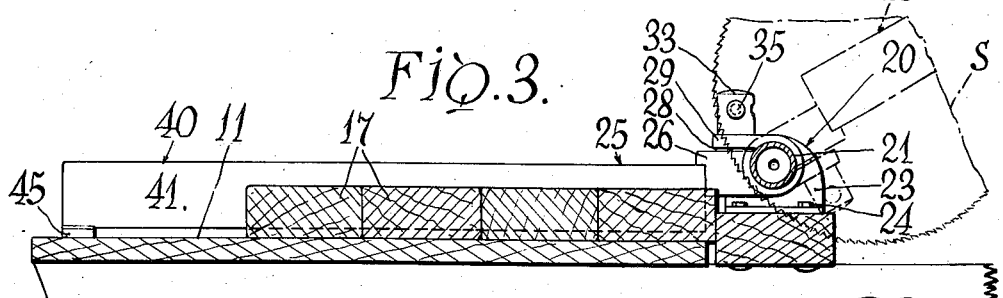
INVENTOR.
Sherwood F. Stoll,
BY
Raymon E. Rousseau
ATTORNEY.

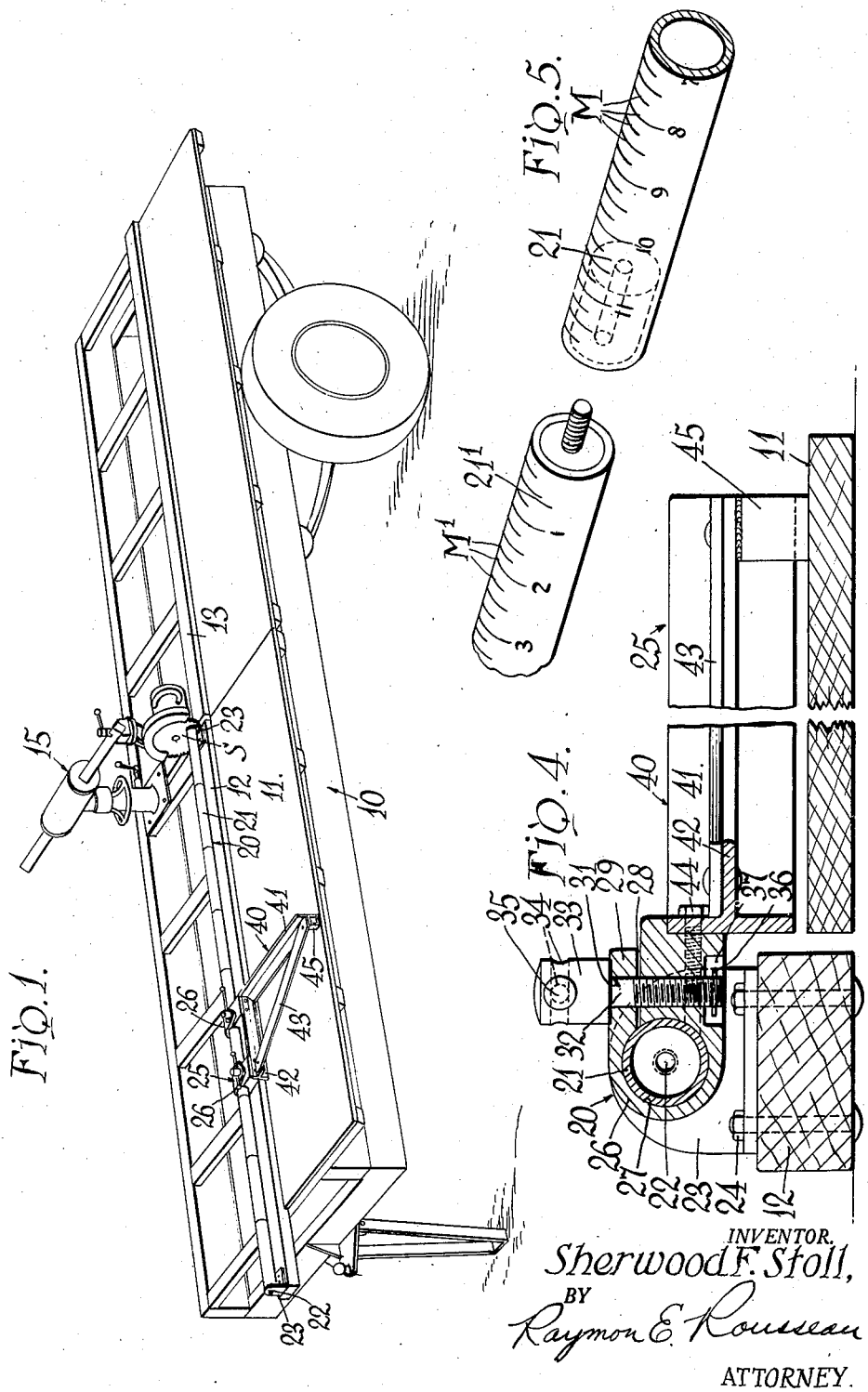

United States Patent Office 2,850,058
Patented Sept. 2, 1958

2,850,058
WORKPIECE LENGTH GAGE FOR POWER SAW TABLES

Sherwood F. Stoll, Getzville, N. Y.

Application May 23, 1956, Serial No. 586,714

2 Claims. (Cl. 143—174)

My invention relates to power saw tables having a power-driven saw mounted for movement across a table in predetermined paths, and more particularly to improvements in work gages including means for quickly setting and clamping the gage to gage the length of workpieces to be cut to a predetermined length.

Prior saw table gages have been open to the objections that they have not been quickly adjustable, have not provided for gaging a plurality of like workpieces simultaneously, and have not been movable to a position allowing all desired uses of the table and the saw.

The objects of my invention are to provide an improved simple work length gaging means quickly operable to simultaneously gage a plurality of workpieces to be sawed to a desired length; to provide a gage means which may be quickly moved to and secured in selected work length gaging positions; to provide a gaging means which may be moved to a position allowing desired uses of the table and the saw; and to provide a simple and inexpensive gaging means which is easy to use and which speeds up, sawing a multiplicity of workpieces to a desired length.

In the drawings:

Fig. 1 is a perspective view showing my improved work engaging means combined with a portable saw table provided with a radial type of power saw.

Fig. 2 is an enlarged plan view showing the gage means of Fig. 1 secured in a selected position to gage the length of a plurality of workpieces which have been sawed to a selected length.

Fig. 3 is a cross sectional view, taken about on line 3—3 of Fig. 2.

Fig. 4 is an enlarged cross sectional view, taken about on line 4—4 of Fig. 2, and showing one of the clamps for securing the gage in a selected position, and Fig. 5 is a perspective view showing how the outer end of a calibrated measuring member of the gage means may be extended by a similar calibrated measuring member to allow gaging and sawing workpieces to a length greater than the length of the first member.

Referring now to Fig. 1 of the drawings, it will be seen that my improved form of gaging means has been combined with a portable type of radial saw table, generally indicated by the numeral 10, in a manner to allow gaging and sawing a plurality of workpieces to a desired length.

The saw table 10 may be of any suitable construction so long as it includes a flat work supporting surface 11, of a size to support a plurality of workpieces in side by side relation thereon, and has its rear edge alined with and forwardly spaced from alined work stop members 12 and 13.

The space between the rear edge of the surface 11 and the members 12 and 13 is provided to allow sawdust or other debris to fall therethrough so as to not interfere with proper engagement of the edge of a workpiece with the stops. The adjacent ends of the members 12 and 13 are also spaced to allow sawdust or other debris to fall therebetween and to allow free passage of the circular saw blade of any type of power saw.

The illustrated power saw is indicated generally by the numeral 15 and being a well known type of manually movable radial saw, need not be described in detail, other than to say that it is rigidly secured to a suitable part of the saw table 10 and is adjustable to allow manual movement of the saw blade S in selected paths including that indicated in the drawings, wherein the saw is adjusted to move across the surface 11 in a path normal thereto and normal to the stops 12 and 13. To insure complete severance of the workpieces, the saw is also adjusted so that its lower edge is slightly below the surface 11.

In order to quickly and accurately saw a plurality of timbers 16 to provide successive pluralities of workpieces 17 to a desired length (Fig. 2), the table is provided with a workpiece length gaging means generally designated by the numeral 20.

The means 20 includes a rod or bar 21, a work length gaging stop means 25, mounted on the bar for sliding movement to selected operative positions and rotative movement between operative and inoperative positions, and means for clamping the stop means in said positions.

More specifically the bar 21, preferably formed of a section of round tubing, has each of its ends formed to receive a stud bolt 22 which passes through an opening in the upright leg of an L-shaped bracket 23. Each bracket 23 has its horizontal leg secured to one end of the stop 12 by bolts 24 so that the bar 21 is secured in spaced parallel relation to the stop 12. As shown in Fig. 1, the stop 12 is extended beyond the left end of the table thereby allowing a longer bar to be used without increasing the length of the table.

In the event the desired length of a workpiece is longer than can be gaged by the bar 21, a similar bar 21' may be alined with and have its inner end secured to the bar 21, in the manner indicated in Fig. 5, and the outer end of the bar 21' may have its outer end supported by one of the brackets 23 secured to the outer end of an extension (not shown) secured in alinement with the stop 12.

The bars 21 and 21' are provided with suitable markings or calibrations M and M' respectively arranged to visually indicate distances from the saw blade in feet, inches and fractions of inches.

A simple, quick, effective and presently preferred form of the work length gaging stop means 25, which allows it to be slid along the bar 21 to selected length gaging positions and which allows it to be rotated on the bar to inoperative positions, is best shown in Figs. 2 and 4. Referring to these figures, it will be seen that a duplicate pair of combined support and clamping blocks 26 are each formed with a bore 27 to slidably and rotatably receive the bar 21 and a slot 28 communicating with the bore 27 to provide a movable upper portion 29. The portions 29 are each formed with a hole 31 to loosely receive a vertically disposed screw 32, the lower end of which has threaded engagement with the body of its block adjacent the bore 27, so that when the screw is turned clockwise, as viewed in Fig. 2, its enlarged head 33 forces the portion 29 towards its block, thereby quickly and effectively clamping the blocks 26 on the bar 21.

Each head 33 is provided with a plurality of through cross holes 34 in any one of which a handle 35 may be engaged to locate the handle to suit the user and to facilitate turning its screw 32.

A cotter pin 36 is detachably secured to the lower end of each screw 32 and is preferably located within a recess 37 formed in the lower face of its block to prevent adventitious removal of the pin and the screw while allowing the latter sufficient movement to clamp the block on the rod and to release it.

A triangularly-shaped gage or stop member of the means 25 is generally designated by the numeral 40. This member may be conveniently formed by mitering the stem of a T-shaped metal element intermediate its ends and bending its head portion to form right-angularly disposed legs 41 and 42. A brace 43 extends diagonally between and has its ends rigidly secured to the outer ends of the legs 41 and 42, thereby maintaining them in their right-angular relation. The leg 42 has each of its outer ends rigidly secured to one of the blocks 26 as by bolts 44 (Figs. 2 and 4) so that the member 40 is rigidly carried by and movable with the spaced blocks along and about the bar and its leg 42 is always normal to the stops 12 and 13 and the bar 21.

The leg 41, being made of a length substantially equal to the width of the surface 11, serves as a length gage against which the ends of all of the timbers which can be placed on the surface 11 in side by side alined relation to each other and to the stops 12 and 13, may be abutted when the stop means 25 is moved to any of its selected operative positions. In these operative positions, a foot 45, secured to the outer end of the leg 42, cooperates with the blocks 26 in supporting the lower edge of the leg 42 in spaced parallel relation to the surface 11, thereby providing therebetween a space, which like the space between the rear edge of the surface 11 and the stops 12 and 13, allows the timbers to be properly positioned against said stops and gage without interference from sawdust or other debris.

As viewed in Fig. 2, the vertical face of the leg 41 and the lower vertical face of the lower block are alined so that when the face of said block is alined with a selected length mark on the bar 21, and either or both of the clamps are tightened, successive pluralities of timbers 16 may be quickly gaged and accurately sawed to provide the workpieces 17 of the selected length.

My improved length gage means allows the stop means 25 to be rotated to and secured in the inoperative position indicated in dot and dash lines in Fig. 3, thus advantageously permitting free use of the surface 11 without interference from the stop means 25, during the other types of sawing operations which can be accomplished with radial saws.

It should now be apparent to those skilled in the art of power sawing that my improved length gage means will appreciably reduce the time and cost of producing a multiplicity of like workpieces. And it should be understood that, while my improved length gage means has been shown and described in combination with a portable saw table and a radial type of power saw, to exemplify its principles, it is readily adaptable for use with other types of tables and saws, and that various modifications, rearrangements and combinations of its component parts may be made within the scope of the appended claims, wherein I claim:

1. An attachment for power saw tables and having a work surface of a length and width to support a plurality of timbers thereon in side-by-side parallel relation against a first stop comprising a straight bar calibrated to show distances of a second stop from the plane of a power actuated saw, a bracket secured to each end of the bar for supporting and securing it independently of other means in spaced parallel relation to the first stop, clamping means embracing the bar for free sliding movement thereon between the brackets, said clamping means including a pair of spaced blocks each slidably and rotatably mounted on the bar, second stop means formed as a right angle shaped frame having the opposite ends of one of its legs secured to and supported by the blocks and the other leg maintained normal to the axis of the bar by a brace and provided at its outer end with a foot engageable with the work surface of the table to maintain the second stop means in spaced parallel relation to said surface during its use as a work length gaging stop.

2. The attachment set forth in claim 1 wherein the clamping blocks are each slotted to provide a relatively movable portion, a screw carried by each block is operable to move the movable portion, thereby to cause the block to grip the bar, and the screw is provided with means arranged to prevent its adventitious or surreptitious removal.

References Cited in the file of this patent

UNITED STATES PATENTS

| 1,017,632 | Williams | Feb. 13, 1912 |
| 1,583,964 | Driggers | May 11, 1926 |
| 2,520,837 | Hammond | Aug. 29, 1950 |